United States Patent
Gibbs et al.

[11] Patent Number: 5,806,196
[45] Date of Patent: Sep. 15, 1998

[54] METHOD AND APPARATUS FOR ALIGNING A TOWED VEHICLE WITH A TOWING VEHICLE

[76] Inventors: Gary T. Gibbs, 2406 Canin Ct., Santa Rosa, Calif. 95405; E. Leon Hopkins, 2112 Lincoln St., Emporia, Kans. 66801

[21] Appl. No.: 840,277

[22] Filed: Apr. 14, 1997

[51] Int. Cl.⁶ ................................................. G01C 9/28
[52] U.S. Cl. ........................... 33/333; 33/264; 33/370; 33/374; 33/376; 116/28 R; 280/477
[58] Field of Search ........................... 33/333, 264, 370, 33/371, 374, 375, 376; 280/477; 116/28 R

[56] References Cited

U.S. PATENT DOCUMENTS

| | | | |
|---|---|---|---|
| 806,987 | 12/1905 | McDowell | 33/383 |
| 1,829,257 | 10/1931 | Best et al. | |
| 2,130,647 | 9/1938 | Milner | 33/381 |
| 2,423,317 | 7/1947 | Holton | 33/375 |
| 2,510,610 | 6/1950 | Twist | 33/370 |
| 2,605,553 | 8/1952 | Kunkel | 33/370 |
| 2,706,341 | 3/1955 | Havens | |
| 2,776,495 | 1/1957 | Dickey | 33/371 |
| 2,805,489 | 9/1957 | Kroll | |
| 3,159,917 | 12/1964 | Whitehead | |
| 3,771,232 | 11/1973 | Specht | 33/375 |
| 3,901,536 | 8/1975 | Black | |
| 3,947,970 | 4/1976 | Lesure | 33/375 |
| 4,143,885 | 3/1979 | Mahosky | |
| 4,168,847 | 9/1979 | Westphal | |
| 4,183,548 | 1/1980 | Schneckloth | |
| 4,972,596 | 11/1990 | Brewer | 33/370 |
| 5,001,838 | 3/1991 | Huxley et al. | |
| 5,063,679 | 11/1991 | Schwandt | 33/370 |
| 5,136,784 | 8/1992 | Marantz | 33/333 |
| 5,174,034 | 12/1992 | Swanda | 33/374 |
| 5,269,554 | 12/1993 | Law et al. | |

*Primary Examiner*—Christopher W. Fulton
*Attorney, Agent, or Firm*—Hovey, Williams, Timmons & Collins

[57] ABSTRACT

A method and apparatus (10) for aligning a towed vehicle (12) with a towing vehicle (14) is disclosed. The method is implemented with an alignment apparatus (10) including a base (22) configured for attachment to the towed vehicle (12), a platform (23) rotatably mounted on the base (22), and a level device (24) mounted on the rotatable platform (23). While the towed vehicle (12) is connected to the towing vehicle (14), the platform (23) and level device (24) are rotated until the level device (24) is in its level position. This sets a reference height position for the towed vehicle (12). When it is desired to reconnect the towed vehicle (12) with the towing vehicle (14), the towed vehicle (12) is raised until the level device (24) is once again in its level position. In one embodiment, the alignment apparatus includes a base hingedly connected to a mounting bracket for permitting side-to-side leveling of the towed vehicle.

7 Claims, 5 Drawing Sheets

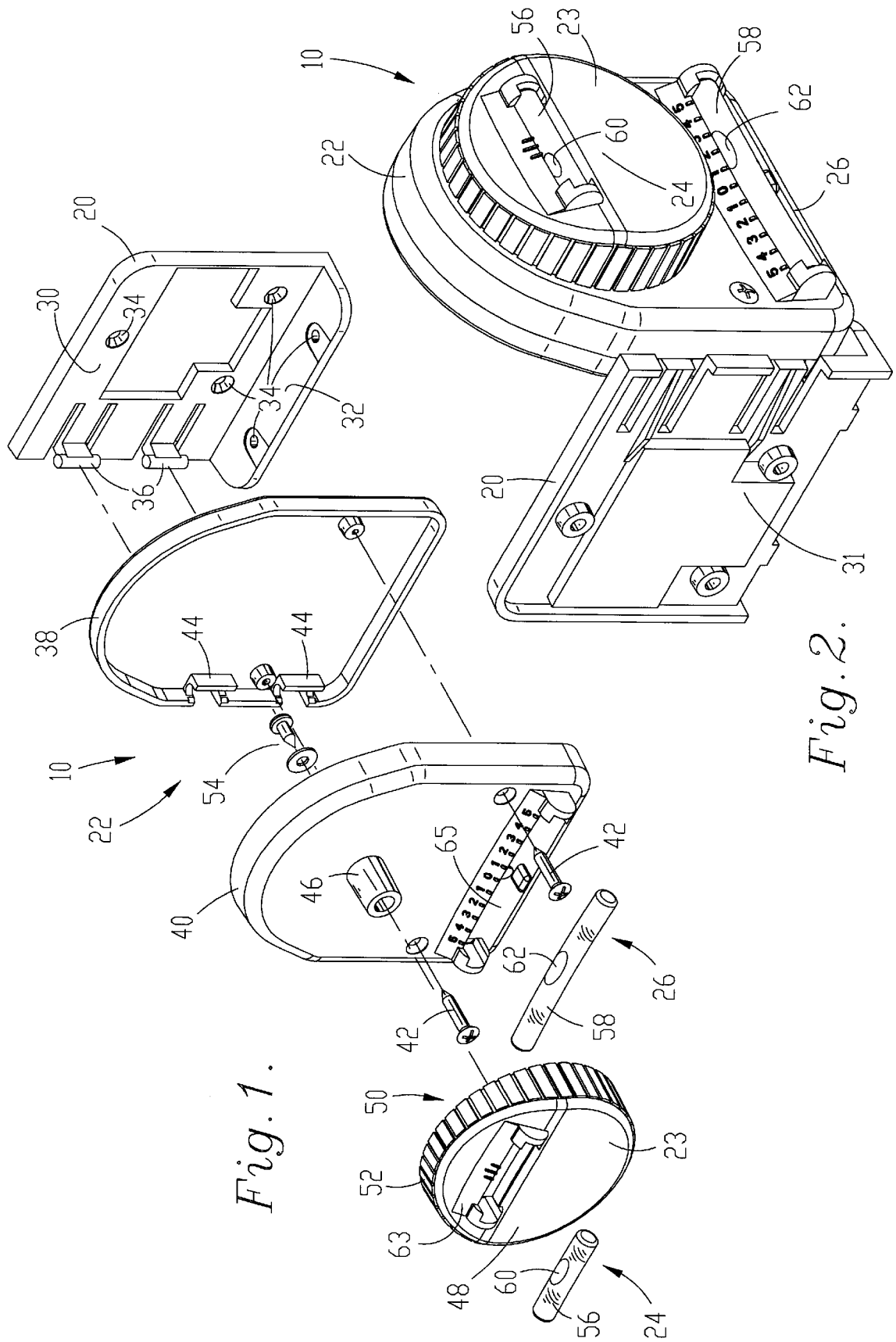

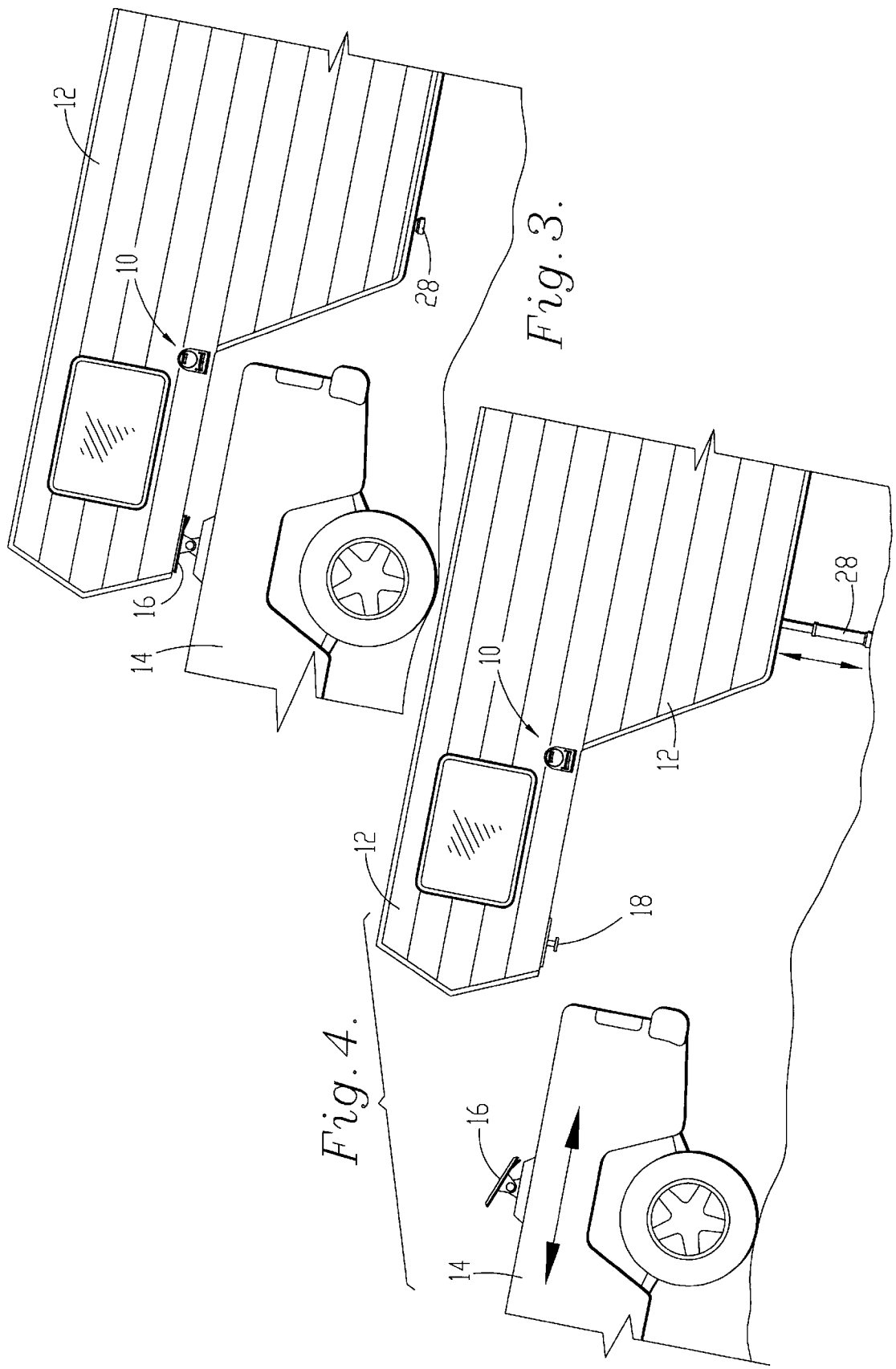

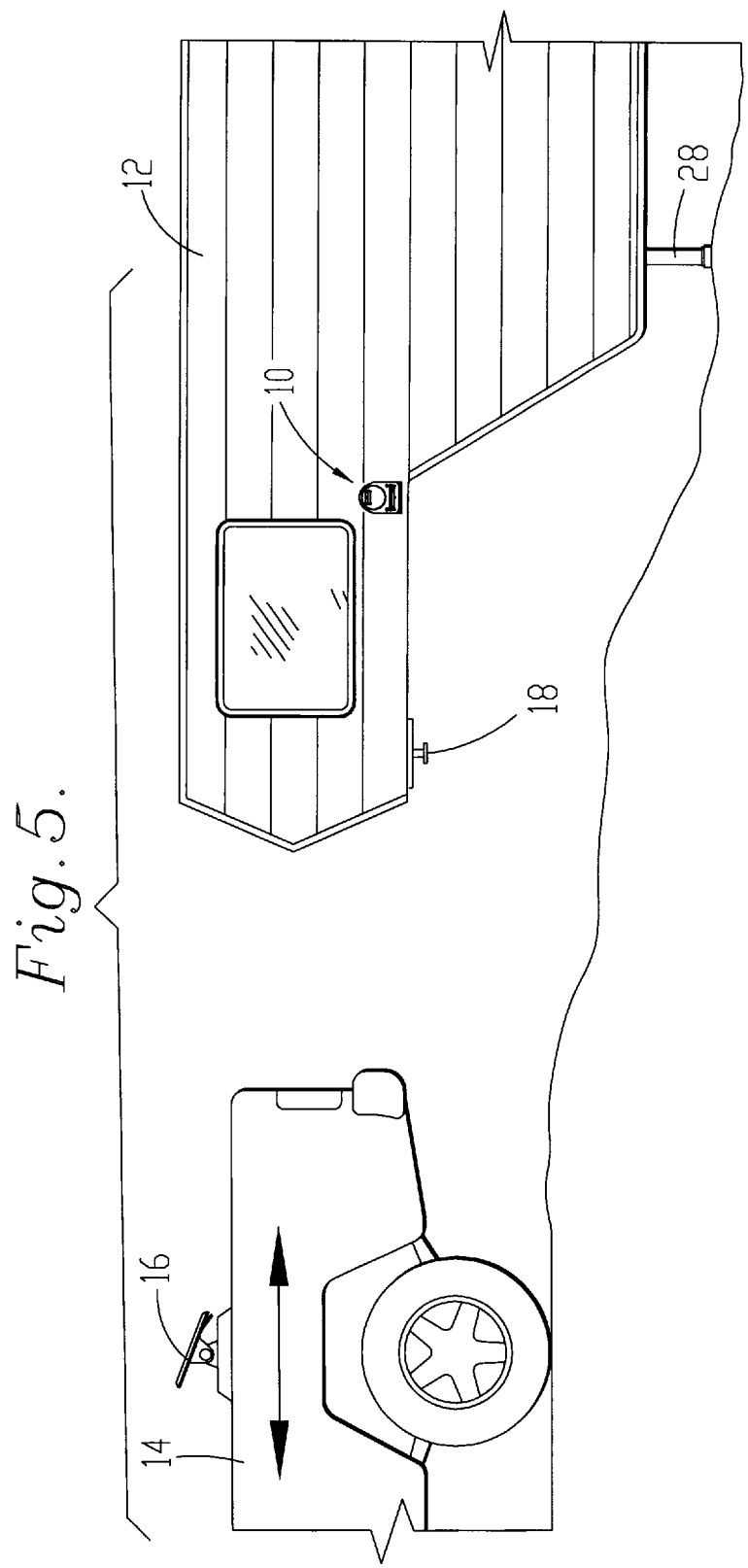

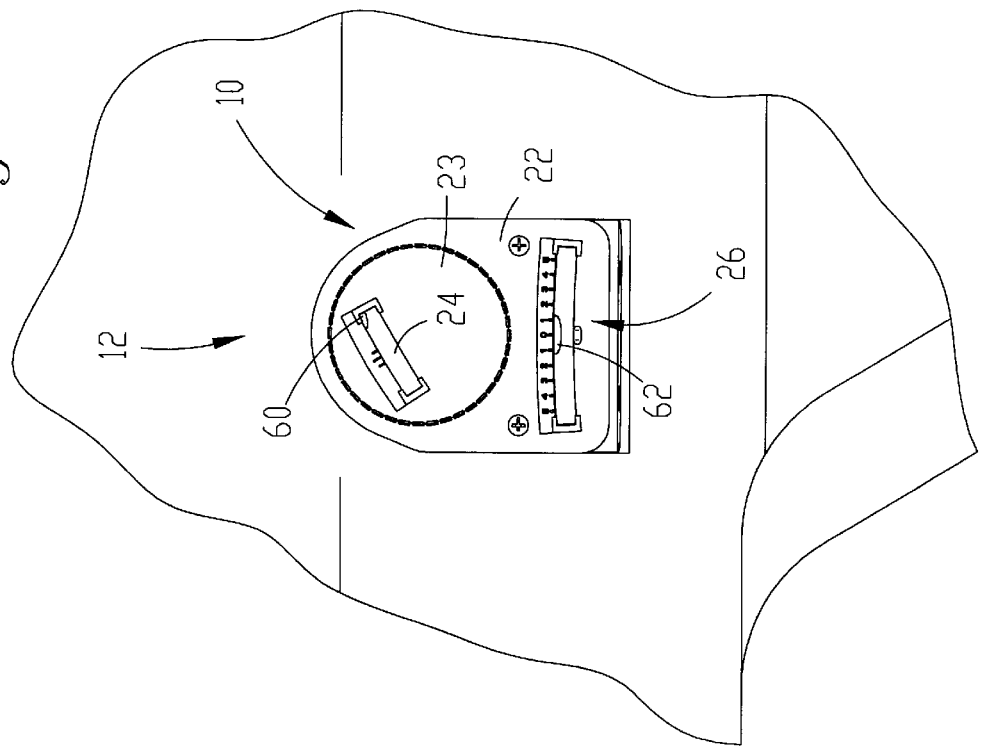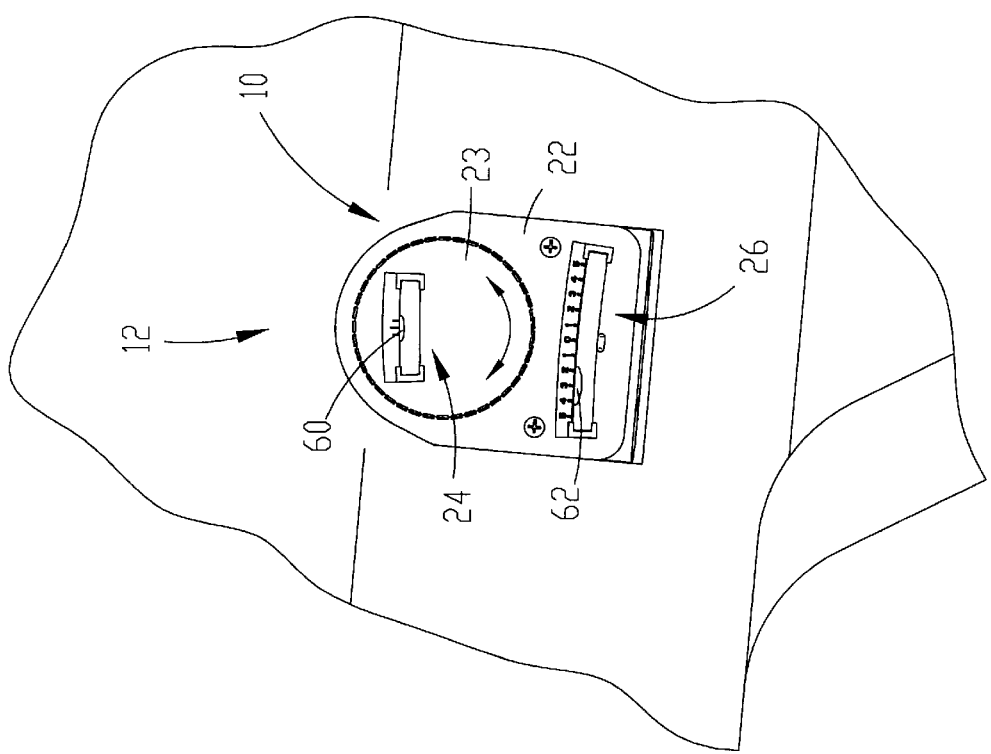

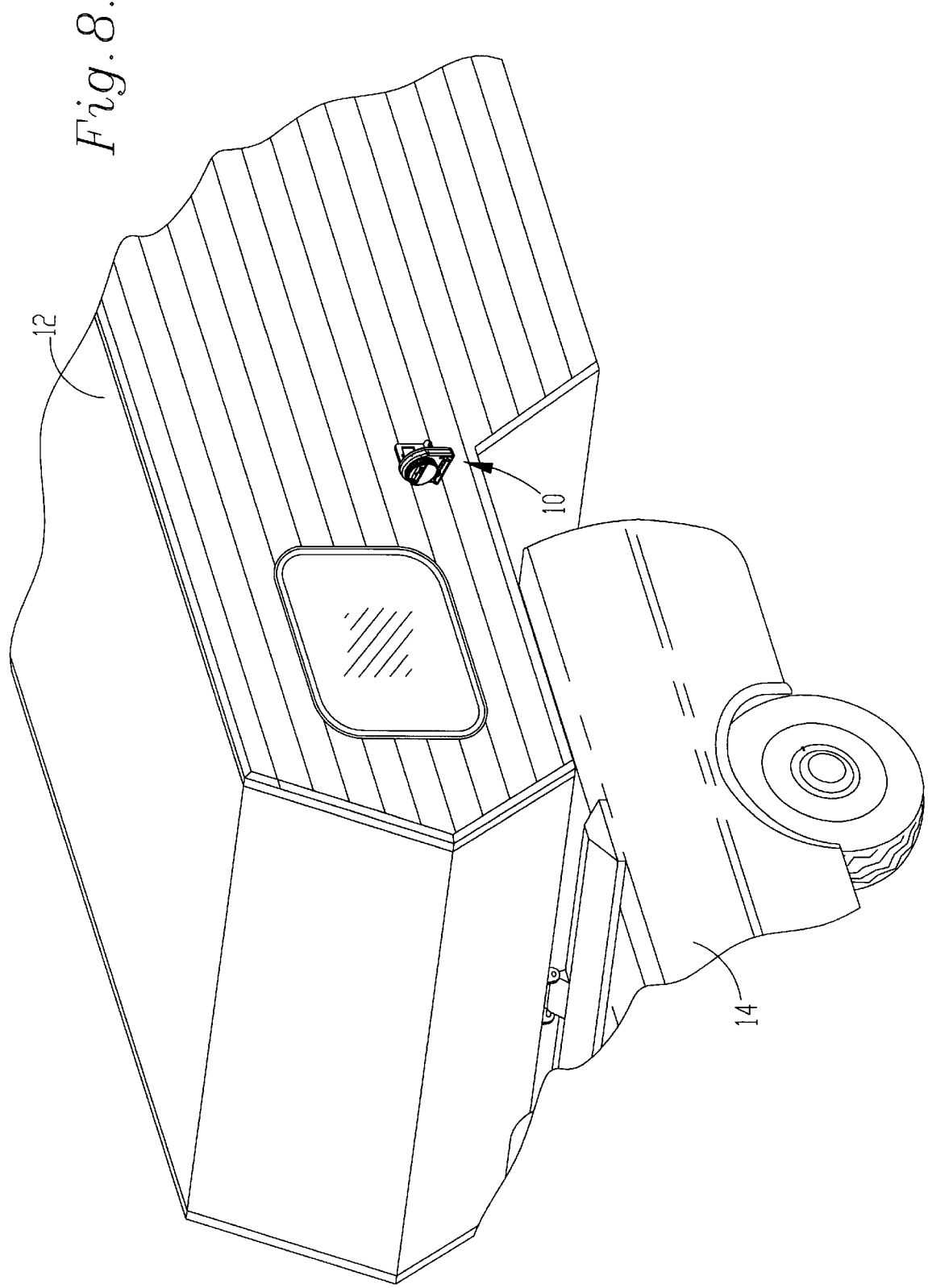

METHOD AND APPARATUS FOR ALIGNING A TOWED VEHICLE WITH A TOWING VEHICLE

RELATED APPLICATIONS

This application claims the priority benefit under 35 U.S.C. § 119(e) of provisional patent application entitled Adjustable Reference Level Device for Trailers, Ser. No. 60/024,573 filed Aug. 26, 1996.

BACKGROUND OF THE INVENTION

1. Field of the Invention

The present invention relates to methods and apparatus for aligning towed vehicles such as trailers with towing vehicles such as trucks. More particularly, the invention relates to such a method and apparatus that uses a level vial to set a reference height position for the towed vehicle while the towed vehicle remains connected to its corresponding towing vehicle. The towed vehicle is then returned to this reference height once it is desired to reconnect the towed vehicle with its towing vehicle.

2. Description of the Prior Art

Towed vehicles such as trailers, campers, and boats are typically connected with their towing vehicles by 5th wheel type supports or ball and socket type hitches. Before the vehicles are connected, however, the towed vehicle must be properly aligned with its corresponding towing vehicle.

Unfortunately, conventional alignment procedures are difficult and time consuming. To align a towed vehicle having a 5th wheel support with its corresponding towing vehicle, the driver must first raise the towed vehicle with hand cranks or a power jack so that the trailer pin on the towed vehicle is at approximately the same height as the hitch on the towing vehicle. The driver then attempts to back the towing vehicle under the forwardly extending tongue on the towed vehicle. If the trailer pin and the hitch are at the same height, they will properly couple together.

However, if the towed vehicle was not raised to its proper height, the trailer pin and hitch will not properly connect. The driver must then get back into the towing vehicle, pull forward, and then raise or lower the towed vehicle in an attempt to once again align the trailer pin and hitch. These steps must typically be repeated several times before the trailer pin and truck hitch are in alignment.

If the towed vehicle is raised so that its trailer pin is slightly lower than the corresponding truck hitch but high enough to engage the skid plate on the hitch, the driver may attempt to force the connection of the pin and hitch by continuing to back the towing vehicle under the towed vehicle. The weight of the towed vehicle may force the springs of the towing vehicle downward so that the trailer pin and truck hitch connect. However, this procedure places excessive pressure on the truck hitch, trailer pin, trailer power jacks, springs, and other mechanical components of the towing vehicle which can damage these components over time.

Prior art alignment methods also require the driver to repeatedly get into and out of the towing vehicle to verify the alignment of the vehicles. This is inconvenient for the driver and subjects the driver to possible injury and stress to his or her neck, back, knees and ankles.

These alignment problems are not unique to 5th wheel type hitches but are also experienced with other types of connectors such as ball and socket type hitches.

OBJECTS AND SUMMARY OF THE INVENTION

In view of the foregoing, it is an object of the present invention to provide an improved method and apparatus for more effectively aligning a towed vehicle with a towing vehicle.

It is a more particular object of the present invention to provide such a method and apparatus that precisely aligns the vehicles without requiring the height of the towed vehicle to be repeatedly readjusted.

It is also an object of the present invention to provide such a method and apparatus that prevents damage to the towing vehicle hitch, the towed vehicle pin, power jacks, and the towing vehicle itself.

It is also an object of the present invention to provide such a method and apparatus that does not require the driver to repeatedly get into and out of the towing vehicle to verify the alignment of the vehicles, thus reducing the driver's exposure to injury.

It is another object of the present invention to provide such a method and apparatus that also permits the towed vehicle to be leveled in both fore-and-aft and side-to-side directions with a single device.

The present invention achieves these objects and other objects that become evident from the following description of the preferred embodiments of the invention by providing an improved method and apparatus for aligning a towed vehicle with a towing vehicle. The preferred method is implemented with an alignment apparatus broadly including a base configured for attachment to the towed vehicle, a platform rotatably mounted on the base, and a level device mounted on the rotatable platform. The preferred level device is a conventional level vial or tube having liquid and a small gas bubble entrapped therein.

The alignment apparatus is first mounted on the towed vehicle. While the towed vehicle is still connected to its towing vehicle, the towed vehicle is raised by its hand cranks or power jacks so that its weight is no longer supported on the hitch of the towing vehicle.

The platform on the alignment apparatus is then rotated until the level device is in its center position. This sets a reference height position for the towed vehicle that corresponds to its height while it is properly aligned with the towing vehicle.

The towing vehicle is then driven out from under the forwardly extending tongue of the towed vehicle so that the towed vehicle may be leveled in a fore-and-aft direction. The alignment apparatus preferably includes a second level device mounted on the base but not on the rotating platform for such leveling. While the towed vehicle is being leveled, the first level device remains locked in its reference position.

When it is desired to reconnect the towed vehicle with the towing vehicle, the towed vehicle is raised until the first level device mounted on the rotating platform is once again in its level position. This permits the towed vehicle to be raised to the exact same height as when it was removed from the towing vehicle so that the hitch and pin are in perfect alignment. The towing vehicle can then be driven under the tongue of the towed vehicle to couple the hitch with the trailer pin.

Advantageously, the method and apparatus of the present invention permit a towed vehicle to be precisely aligned with its corresponding towing vehicle without repeatedly readjusting the height of the towed vehicle. With the present method and apparatus, a driver can easily connect a towed vehicle without repeatedly getting into and out of the towing vehicle, thus reducing the chance for injury and strain. The method and apparatus also prevent damage to the towing vehicle hitch, towed vehicle trailer pin, power jacks, and the towing vehicle itself.

In a preferred embodiment of the invention, the aligning apparatus also includes structure for permitting side-to-side leveling of the towed vehicle. To this end, the base is hingedly connected to a bracket that is attached to the towed vehicle. Before the towed vehicle is disconnected from the towing vehicle, the base containing the levels is pivoted 900 away from the bracket and the towed vehicle. This permits the driver to make a side-to-side reading to determine the height of a riser to be used on the low side of the towed vehicle. The towed vehicle is then towed onto the riser to level it side-to-side.

The base is then pivoted back so that it is flush with the bracket and the towed vehicle for locking in a reference height position and fore-and-aft leveling as described above.

BRIEF DESCRIPTION OF THE DRAWING FIGURES

A preferred embodiment of the present invention is described in detail below with reference to the attached drawing figures, wherein:

FIG. 1 is an exploded perspective view of an alignment apparatus constructed in accordance with a preferred embodiment of the present invention;

FIG. 2 is a perspective view of the alignment apparatus shifted to permit side-to-side leveling of the towed vehicle;

FIG. 3 is a schematic view illustrating a towed vehicle connected to a towing vehicle;

FIG. 4 is a schematic view illustrating the towed vehicle after it has been removed from the towing vehicle but before it has been leveled;

FIG. 5 is a schematic view illustrating the towed vehicle after it has been leveled;

FIG. 6 is an enlarged view of the aligning apparatus shown in the position corresponding to FIG. 4;

FIG. 7 is an enlarged view of the aligning apparatus shown in the position corresponding to FIG. 5; and FIG. 8 is a schematic view illustrating side-toside leveling of the towed vehicle.

DETAILED DESCRIPTION OF THE PREFERRED EMBODIMENTS

The drawing figures illustrate an alignment apparatus 10 constructed in accordance with a preferred embodiment of the invention. As illustrated in FIGS. 3–5, the apparatus 10 is used to align a towed vehicle 12 such as a trailer, boat or camper with its corresponding towing vehicle 14 such as a truck.

The drawings illustrate a towing vehicle 14 having a 5th wheel-type mounting hitch 16 and a towed vehicle 12 having a corresponding 5th wheel-type trailer pin 18. However, the apparatus 10 and method of the present invention may be used equally well with other towing connectors such as ball and socket-type hitches.

As best illustrated in FIGS. 1 and 2, the preferred alignment apparatus 10 broadly includes a mounting bracket 20, a base 22 hingedly connected to the mounting bracket, a platform 23 rotatably mounted to the base, and a pair of level devices 24,26 supported on the base. The components of the alignment apparatus 10 are preferably formed of synthetic resin materials but may also be formed of other suitable materials.

In more detail, the mounting bracket 20 is configured for attachment to the towed vehicle 12 at a location near the towed vehicle's hand crank or power jack switch for lifting jacks 28 as illustrated in FIGS. 3–5. Returning to FIG. 1, the bracket 20 includes a vertically extending wall 30 and a generally horizontally extending foot plate 32 extending outwardly from the bottom of the wall.

As best illustrated in FIG. 2, the rear face of the wall 30 has a raised T-shaped area 31 for receiving double-coated foam tape for use in securing the bracket 20 to the towed vehicle 12. The wall 30 and the foot plate 32 also have a plurality of screw holes 34 for use in screwing or bolting the mounting bracket 20 to the towed vehicle 12. One side of the wall 30 includes a pair of vertically extending hinge pins 36.

The base 22 preferably includes a pair of mating segments 38,40 that are coupled together by screws 42 or bolts. Each segment 38,40 includes a pair of segmented hinge leaves 44 that fit over and pivotally mount the base on the hinge pins 44 when the segments 38,40 are screwed together. This hingedly connects the base 22 to the mounting bracket 20. The front face of the segment 40 also includes a hollow, cylindrical mounting sleeve 46 extending outwardly therefrom.

The base 22 is shiftable relative to the mounting bracket 20 between a first position wherein it overlies the bracket as illustrated in FIGS. 6 and 7 and a second position wherein it extends generally perpendicularly from one side of the bracket as illustrated in FIGS. 2 and 8. The importance of this is described below.

The platform 23 is preferably circular and has opposed front 48 and rear 50 faces and a circumventing sidewall 52. The sidewall 52 is preferably ribbed so that it can be more easily gripped.

The rear face 50 of the platform 23 includes an outwardly extending stub shaft (not shown) that is inserted through the mounting sleeve 46 on the base segment 40. The stub shaft is held in the sleeve 46 by a screw and washer 54 that is inserted into the end of the stub shaft. The sleeve 46 and stub shaft permit the platform 23 to be manually rotated relative to the base 22. However, the screw and washer 54 prevent the platform 23 from moving on its own after it has been rotated.

The first level device 24 is mounted to the front face 48 of the rotating platform 23 and is used for aligning the towed vehicle 12 with the towing vehicle 14 as described below. The second level device 26 is mounted directly to the front face of the segment 40 of the base 22 directly below the rotating platform 23 and is used for leveling the towed vehicle 12 in a side-to-side direction before it is disconnected from the towing vehicle and for leveling the towed vehicle 12 in a fore-and-aft direction after it has been disconnected from the towing vehicle 14 as described below.

Both level devices 24,26 are preferably conventional level vials each including a bent glass or plastic tube 56,58 having liquid and a small gas bubble 60,62 entrapped therein. The bubbles 60,62 float to the center of their respective tubes 56,58 when the vials are leveled. The tubes are each mounted in a support jacket 63,65. The support jackets 63,65 each have center marks to indicate the center position of their respective bubbles 60,62.

The use of the alignment apparatus 10 to align a towed vehicle 12 with a towing vehicle 14 and to level the towed vehicle is best understood with reference to FIGS. 3–8. The alignment apparatus 10 is first mounted on the towed vehicle 12, preferably near the hand crank or power jack switch for lifting jacks 28 so that it may be easily viewed while adjusting the height of the towed vehicle.

Initially, the alignment apparatus 10 is used to level the towed vehicle 12 in a side-to-side direction. To accomplish this, the base 22 is pivoted 90° away from the bracket 20 before the towed vehicle is disconnected from the towing vehicle as illustrated in FIG. 8. This allows the driver to make a side-to-side reading on the second level device 26 to determine the height of a riser to be placed under the low side of the towed vehicle. The towed vehicle is then towed onto the riser to level it side-to-side.

Then, the alignment apparatus 10 is used to lock in a reference height position of the towed vehicle for alignment purposes. To accomplish this, the base 22 is pivoted back to its starting position so that it is flush with the bracket 20 and the towed vehicle as illustrated in FIGS. 3–5.

While the towed vehicle 12 is still connected to its towing vehicle 14 as illustrated in FIG. 3, the towed vehicle 12 is raised by its lifting jacks 28 just enough so that its weight is no longer supported on the hitch 16 of the towing vehicle. At this point, the hitch and pin are in perfect alignment. As illustrated in FIG. 6, the platform 23 of the alignment apparatus 10 is then rotated until the bubble 60 in the first level device 24 is in its center position.

This sets a reference height position for the towed vehicle 12 that corresponds to its height while it is properly aligned with its corresponding towing vehicle 14. At this point, the second level device 26 is typically not in its level position because the towed vehicle 12 is not level.

The towing vehicle 14 is then moved out from under the tongue of the towed vehicle 12 as depicted in FIG. 4. At this point, the first and second level devices 24,26 are still in the positions depicted in FIG. 6.

The towed vehicle 12 is then lowered using the lifting jacks 28 as illustrated in FIG. 5. While lowering the towed vehicle 12, the second level device 26 is used to level the towed vehicle in a fore-and-aft direction. Specifically, the front end of the towed vehicle 12 is lowered or raised until the bubble 62 in the second level device 26 is in its center position as depicted in FIG. 7.

While the towed vehicle 12 is being leveled in a fore-and-aft direction, the first level device 24 remains locked in its reference position. Therefore, the bubble 60 moves away from its center position as illustrated in FIG. 7. The position of the rotating platform 23 and the first level device 24 relative to the base 22 is slightly exaggerated in FIG. 7 to clearly illustrate the operation of the apparatus 10.

When it is desired to reconnect the towed vehicle 12 with the towing vehicle 14, the tongue of the towed vehicle is raised as illustrated in FIG. 4 until the bubble 60 in the first level device 24 is once again at its center position as depicted in FIG. 6. When the bubble 60 is in its center position, the towed vehicle 12 will be at the exact same height as when it was removed from the towing vehicle 14.

The towing 14 vehicle can then be driven under the tongue of the towed vehicle 12 to couple its hitch 16 with the trailer pin 18 on the towed vehicle as illustrated in FIG. 4. Finally, the tongue of the towed vehicle 12 is lowered with the crank 28 or jack until its weight is fully supported on the towing vehicle 14.

The alignment apparatus 10 and method of the present invention permit the towed vehicle 12 to be precisely raised to its proper height without repeatedly readjusting its height. The apparatus 10 and method prevent damage to the towing vehicle hitch 16, towed vehicle trailer pin 18, towed vehicle power jacks 28, and the towing vehicle 14. The apparatus and method also eliminates the need for the driver to repeatedly get into and out of the towing vehicle and therefore reduces injury and strain to the driver.

Although the invention has been described with reference to the preferred embodiment illustrated in the attached drawing figures, it is noted that equivalents may be employed and substitutions made herein without departing from the scope of the invention as recited in the claims. For example, although the first and second level devices of the present invention are preferably conventional level vials, they may be any type of level devices.

Having thus described the preferred embodiment of the invention, what is claimed as new and desired to be protected by Letters Patent includes the following:

1. A method for aligning a towed vehicle with a towing vehicle, the method comprising the steps of:

mounting a level device to the towed vehicle;

raising the towed vehicle while it is still connected to the towing vehicle so that the towed vehicle's weight is no longer supported by the towing vehicle;

adjusting the level device so that it is set to its level position;

moving the towing vehicle out from under the towed vehicle;

leveling the towed vehicle; and when it is desired to reconnect the towed vehicle with the towing vehicle, adjusting the height of the towed vehicle so that the level device is once against at its level position.

2. The method as set forth in claim 1, wherein the level device includes a level vial having a bubble therein mounted to a rotatable platform.

3. The method as set forth in claim 2, wherein the adjusting step includes rotating the platform until the bubble in the level vial is in the center of the level vial.

4. An apparatus for aligning a towed vehicle with a towing vehicle, the apparatus comprising:

a mounting bracket for attachment to the towed vehicle;

a base hingedly connected to the mounting bracket and shiftable between a first position wherein the base overlies the bracket and a second position wherein the base extends generally perpendicularly from the bracket;

a platform rotatably mounted on the base; and a first level mounted on the rotatable platform;

the platform and the first level being rotatable to a reference position wherein the level is set to its level position while the towed vehicle is connected to the towing vehicle.

5. The apparatus as set forth in claim 4, further including a second level mounted on the base but not on the platform for use in leveling the towed vehicle after the towed vehicle has been disconnected from the towing vehicle.

6. The apparatus as set forth in claim 5, wherein the second level is a level vial filled with liquid and a small gas bubble.

7. The apparatus as set forth in claim 4, wherein the first level is a level vial filled with liquid and a small gas bubble.

* * * * *